United States Patent
Yu

(10) Patent No.: US 9,462,007 B2
(45) Date of Patent: *Oct. 4, 2016

(54) HUMAN USER VERIFICATION OF HIGH-RISK NETWORK ACCESS

(71) Applicant: Fortinet, Inc., Sunnyvale, CA (US)

(72) Inventor: Qianyong Yu, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,339

(22) Filed: Dec. 28, 2015

(65) Prior Publication Data

US 2016/0112439 A1   Apr. 21, 2016

Related U.S. Application Data

(63) Continuation of application No. 14/713,919, filed on May 15, 205, now Pat. No. 9,231,910, which is a continuation of application No. 14/133,949, filed on Dec. 19, 2013, now Pat. No. 9,083,677.

(51) Int. Cl.
*H04L 29/06* (2006.01)
*G06F 21/32* (2013.01)
(Continued)

(52) U.S. Cl.
CPC ............ *H04L 63/126* (2013.01); *G06F 21/31* (2013.01); *G06F 21/32* (2013.01); *G06F 21/34* (2013.01); *G06F 21/36* (2013.01); *G06F 21/42* (2013.01); *H04L 63/02* (2013.01); *H04L 63/08* (2013.01); *H04L 63/083* (2013.01); *H04L 63/0853* (2013.01); *H04L 63/0861* (2013.01); *H04L 63/102* (2013.01); *H04L 63/1408* (2013.01); *H04L 63/1466* (2013.01); *H04L 67/306* (2013.01); *G06F 2221/2103* (2013.01); *G06F 2221/2133* (2013.01)

(58) Field of Classification Search
USPC ......................................................... 726/11
See application file for complete search history.

(56) References Cited

U.S. PATENT DOCUMENTS 9,083,677 B1   7/2015   Yu
9,231,910 B2   1/2016   Yu
(Continued)

OTHER PUBLICATIONS

Non-Final Rejection for U.S. Appl. No. 14/133,949 mailed Jan. 8, 2015.
(Continued)

*Primary Examiner* — Jason Lee
(74) *Attorney, Agent, or Firm* — Hamilton, DeSanctis & Cha LLP

(57) ABSTRACT

Systems and methods for performing a human user test when a high-risk network access is captured by an intermediary security device are provided. According to one embodiment, network security application includes a network traffic control module, a human user test engine and a risk management module. The network traffic control module identifies a high-risk network access initiated by a device associated with a private network protected by the network security appliance. The human user test engine (i) sends a human user test message to the human user of the device to verify that the high-risk network access was initiated by or is otherwise authorized by the human user of the device; receives a response to the human user test message; and (iii) determines whether the response is a correct response to the human user test message. The risk management module allows the high-risk network access when the response is correct.

12 Claims, 6 Drawing Sheets

(51) Int. Cl.
*G06F 21/31* (2013.01)
*G06F 21/34* (2013.01)
*G06F 21/42* (2013.01)
*G06F 21/36* (2013.01)
*H04L 29/08* (2006.01)

(56) References Cited

U.S. PATENT DOCUMENTS

2005/0065802 A1\* 3/2005 Rui ................... G06Q 30/02
 715/764
2011/0047045 A1\* 2/2011 Brody ............... G06Q 20/0655
 705/26.41
2011/0292031 A1\* 12/2011 Zhu ....................... G06T 19/20
 345/419
2015/0180829 A1 6/2015 Yu
2015/0249641 A1 9/2015 Yu

OTHER PUBLICATIONS

Notice of Allowance for U.S. Appl. No. 14/133,949 mailed Jun. 9, 2015.
Bergman, R. et al. Towards Hiuman Interactive in the Text-Domain Using the Problem of Sense Ambiguity for Security Information Security. 2004. 12 pgs.
Notice of Allowance for U.S. Appl. No. 14/713,919 mailed Nov. 20, 2015.

\* cited by examiner

HUMAN USER VERIFICATION OF HIGH-RISK NETWORK ACCESS

CROSS-REFERENCE TO RELATED APPLICATIONS

This application is a continuation of U.S. patent application Ser. No. 14/713,919, filed May 15, 2015, now U.S. Pat. No. 9,231,910, which is a continuation of U.S. patent application Ser. No. 14/133,949, filed Dec. 19, 2013, now U.S. Pat. No. 9,083,677, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013-2015, Fortinet, Inc.

BACKGROUND

1. Field

Embodiments of the present invention generally relate to the field of network security techniques. In particular, various embodiments relate to human user verification of high risk network access performed on an intermediary security device.

2. Description of the Related Art

Malware includes software that may be loaded onto a computer for performing operations against an interest or intension of a user. Malware commonly perform automated network access without notification to or awareness by the user. Such network accesses include downloading malware via drive-by-download. In this case, a website contains one or more web browser exploits that will execute arbitrary code on the user's computer automatically when the user visits that site with a vulnerable version of a web browser. Some malware may download other malware modules or updates to an infected computer. Most of the time a successful exploit (or social engineering attack) first installs a loader program on the victim's computer, which then loads other malware (e.g., a rootkit, a bot, a spambot, a password stealer or the like) and future updates of those malware automatically. Some malware connect to botnet command and control (C&C) servers to retrieve instructions or upload stolen information. Most bots connect to their C&C servers on a regular basis as long as the victim computer is running. Many modern bots try to disguise their C&C communication as normal HyperText Transfer Protocol (HTTP) traffic. Some malware actively scan or attack other computers on the Internet or a local network to which the infected computer is attached. Many bots include modules to scan a network range or websites for vulnerable systems, or perform Distributed Denial of Service (DDoS) attacks on other websites as instructed by the C&C server.

In view of the foregoing, it is desirable to identify and verify high-risk network accesses.

SUMMARY

Systems and methods are described for verifying a high-risk network access has been initiated by or is otherwise authorized by a human user. According to one embodiment, network security application includes a network traffic control module, a human user test engine and a risk management module. The network traffic control module identifies a high-risk network access initiated by a device associated with a private network protected by the network security appliance. The human user test engine (i) sends a human user test message to the human user of the device to verify that the high-risk network access was initiated by or is otherwise authorized by the human user of the device; (ii) receives a response to the human user test message; and (iii) determines whether the response is a correct response to the human user test message. The risk management module allows the high-risk network access when the response is correct.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
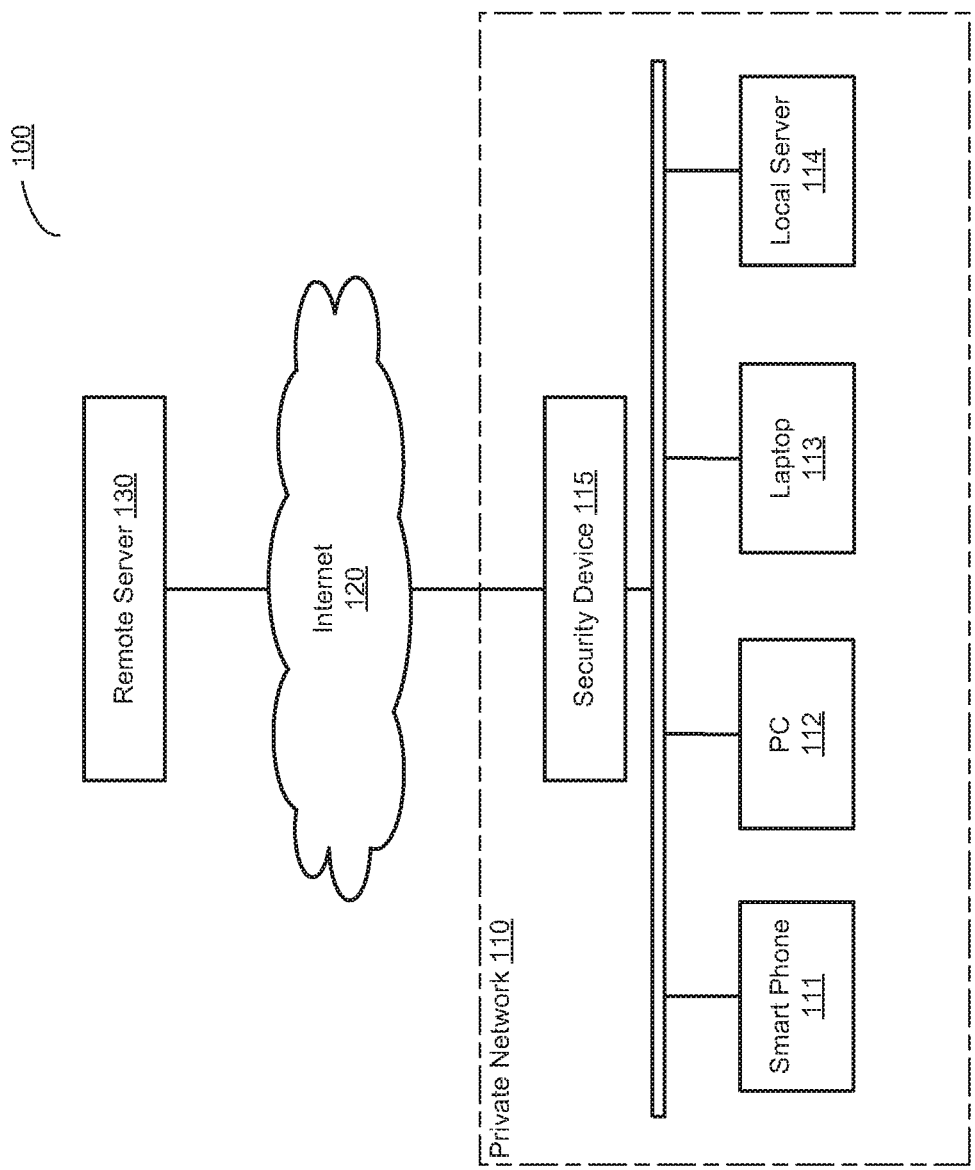
FIG. 1 is a block diagram conceptually illustrating an exemplary environment in which various embodiments of the present invention may be employed.

Systems and methods are described for verifying a high-risk network access has been initiated by or is otherwise authorized by a human user. According to one embodiment, automated network accesses initiated by malware can be identified and blocked by an intermediary security device, such as a gateway or a firewall. Responsive to observing a high-risk network access, the intermediary security device may send a verification message to the user. The intermediary security device may allow the network access if an appropriate response to the verification message is received from the user. According to one embodiment, the verification message is something other than a simple Yes or No message, which could be easily intercepted and bypassed by malware without displaying the verification message to the user.

According to one embodiment, when a high-risk network access is observed by an intermediary security device, a human user test message is sent to a potential user. If a correct answer to the human user test is received from the potential user, the intermediary security device allows the access. By sending a human user test message to the user, instead of a simple inquiry message, malware that is controlling the user's computer cannot bypass the human user test.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

TERMINOLOGY

Brief definitions of terms used throughout this application are given below.

The phase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an exemplary network architecture 100 conceptually showing a network environment in which various embodiments of the present invention may be employed. As shown in FIG. 1, network architecture 100 comprises a private network 110 connected to a remote server 130 through Internet 120. Private network 110 comprises multiple network appliances 111-114 and a security device 115. The network appliances may include smart phone 111, PC 112, laptop 113, local server 114 and other such computing devices that are operatively coupled to each other through a Local Area Network (LAN), wherein the LAN is then operatively coupled with security device 115 which enable access to remote server 130 through Internet 120.

In the present example, security device 115 separates the external computing environment, represented by Internet 120 and remote server 130, from the internal computing environment of private network 110. Security device 115 may intercept or otherwise observe communications between Internet 120 and the network appliances of private network 110 to identify potentially high-risk network accesses. Security device 1150 may also scan such communications for malware, viruses and/or other indicators of the presence of same. It will be appreciated by those skilled in the art that a network appliance may be infected with a virus or malware despite the existence of a network security device within the private network and/or the presence of antivirus software on the network appliance.

A virus or malware that has infected PC 112, for example, may try to perform a network access, such as connecting to remote server 130 from PC 112, without awareness of the user of PC 112. When the access to remote server 130 is detected by security device 115 and is identified as a high-risk network access, a human user test message may be sent, displayed or otherwise directed to the user to verify whether the network access at issue was initiated by the user or is otherwise authorized by the user. In another embodiment, the human user test may be sent to an administrator or another user that is responsible for controlling the security of the private network. In one embodiment, the human user test message is designed so as to be difficult to be answered by an automatic recognition process. As such, it is not a simple matter for the potential malware that may have initiated the network access in question to bypass the verification test. When a correct response from the user is received, security device 115 may decide that the response is actually sent by the user, rather than by malware that may be controlling the user's computer, and the high-risk network access may be allowed by security device 115.

Security device 115 may be implemented as a gateway device, such as a FortiGate® device, or other network appliance. The structure and operation of the security device that performs the human user verification test to verify a high-risk network access is described in further detail below with reference to FIGS. 2-5.

Figure 2:
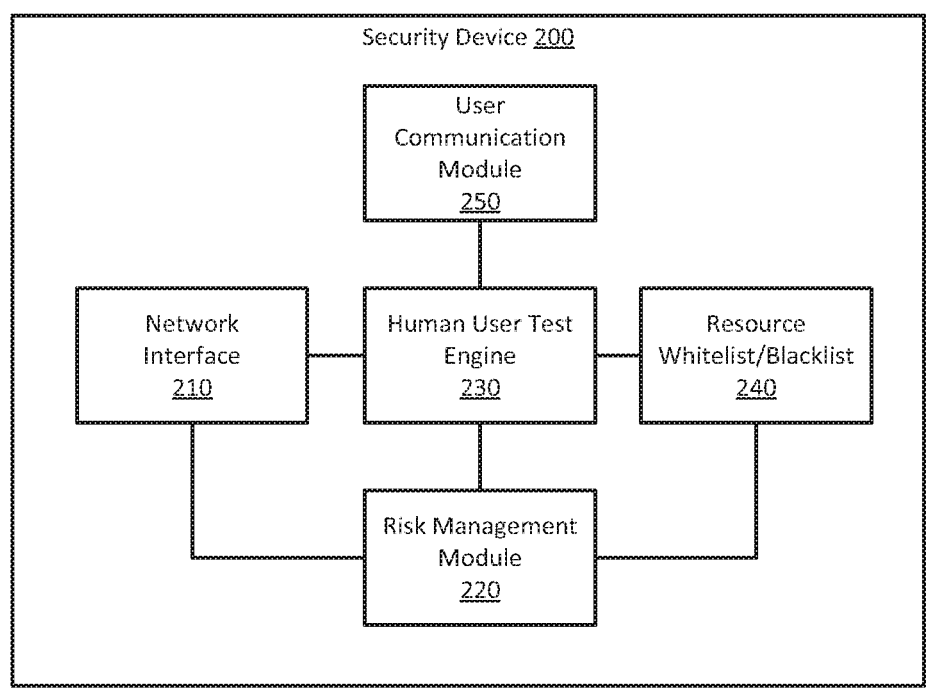
FIG. 2 illustrates exemplary functional units of a human user verification system in accordance with an embodiment of the present invention.

FIG. 2 illustrates exemplary functional units of a security device 200 with a human user test engine 230 in accordance with an embodiment of the present invention. Security device 200 shown in FIG. 2 may be any of a number of existing or future security devices, including, but not limited to, a router, a switch, a hub, a gateway or a firewall, and may scan, control or otherwise monitor communications among computing devices within the private network and/or communications among computing devices within the private network and those external to the private network. In the present example, security device 200 includes a network interface 210, a risk management module 220, a human user test engine 230, a resource whitelist/blacklist 240 and a user communication module 250.

Network interface 210 may capture data packets exchanged among the network appliances within the private network and the Internet. According to one embodiment, before the data packets are sent to their destinations, they may be buffered and inspected by risk management module 220. If the data packets are allowed by the risk management module 220, they may be routed to their destinations. If the data packets are not allowed, they may be discarded by network interface 210. In another embodiment, network interface 210 may capture an access request to a network resource, such as an access request to an internal or external web page or file. One or both of the link and network resource (e.g., the web page or the file) may be inspected by risk management module 220.

In one embodiment, risk management module 220 scans and analyzes the data packets captured by network interface 210. The scanning may include one or more of performing one or more packet-based inspection techniques, one or more flow-based inspection techniques, or proxy-based inspection of the data packets. Packet-based inspection may involve examining the data part (e.g., a payload) and optionally a header of a data packet. For example, the data part and the header may be searched for protocol compliance/non-compliance, virus, spam, intrusion, or any other defined criteria to decide whether the data packet should be allowed to pass, should be routed to a different destination, dropped, or should be observed for collecting statistical information.

Flow-based inspection may involve sampling of multiple data packets from one session or across multiple sessions. Pattern matching techniques may then be used to determine the activity being performed by the session(s). Potential threats may be identified using pattern matching techniques.

Proxy-based inspection techniques may involve reconstructing content of the data packet in response to passing of the data packet from source to destination to determine any security threats within the data packet. By using one or more of these or other inspection techniques, risk management module 220 may detect security threats in the data packets or the corresponding network resources.

In other embodiments, risk management module 220 may further comprise multiple scanning engines to perform different inspections. These scanning engines may include anti-virus, anti-spam, Distributed Denial of Service (DDoS) prevention, Intrusion Detection System (IDS)/Intrusion Prevention System (IPS) functionality and the like. The results of these scanning engines may be combined, weighted or otherwise evaluated in the aggregate to determine if a human user test is needed before the network access at issue is allowed.

In some embodiments, the security device (e.g., security device 200), in which risk management module 220 is integrated may additionally provide unified threat management (UTM) features/functionality. In other embodiments, risk management module 220 may be a separate module or device from security device 200. For example, a separate DDoS prevention device may be used to perform DDoS scanning for security device 200. Security device 200 may also send the intercepted data packets to a cloud-based security scanning service for virus inspection and/or content filtering. Exemplary functions and structures of risk management module 220 are described in further detail below with reference to FIG. 3.

Human user test engine 230 is used for performing human user testing in order to distinguish if a network access is actually initiated by a human user or by an automatic process of malware that may be running on a user's computer. When a high-risk network access is detected by risk management module 220, human user test engine 230 generates a challenge question to be posed to the human user of the computer. When human user test engine 230 receives an answer to the challenge question, it compares the received answer with the correct answer to the challenge question. Human user test engine 230 then sends the test result to risk management module 220. Exemplary structure and functions of human user test engine 230 are described in further detail below with reference to FIG. 4.

In the example shown in FIG. 2, security device 200 may comprise resource whitelist/blacklist 240. Resource whitelist/blacklist 240 may record the network resources that are allowed and/or blocked by security device 200. The whitelist/blacklist may include a list of specific Internet Protocol (IP) addresses, network segments, Uniform Resource Locators (URLs), domain names or other network resources that are to be allowed and/or blocked. Resource whitelist/blacklist 240 may further contain other items, such as user ids and/or time periods, so that the whitelist/blacklist may control the access with more granularity. The resource whitelist/blacklist 240 may be updated when a resource access verification/rejection is received by a human user. Resource whitelist/blacklist 240 may also be imported or edited by a network administrator or a user when security device 200 is setup. It will be appreciated by those of skill in the art that resource whitelist/blacklist 240 may be a local list that is used solely by security device 200 itself or a cloud-based whitelist/blacklist that may be shared by multiple security devices. Resource whitelist/blacklist 240 is accessed by risk management module 220 to check if the network access at issue is to be blocked/allowed without further analysis. If the access is already in the whitelist/blacklist, it is allowed/blocked (as appropriate) without further identification or verification. Whitelist/blacklist techniques are well-known in the art; therefore, a detailed description thereof is omitted.

In the embodiment shown in FIG. 2, security device 200 may further comprise user communication module 250. User communication module 250 may server as an alternative or additional channel for sending a human user test message and/or for receiving a response to the test message. Generally, when security device 200 captures a high-risk network access, the source and corresponding application of the access may be identified. The human user test message may be sent to the source of the access as a response message of the application through network interface 210. However, in this embodiment, user communication module 250 may be used for sending the human user test message. For example, user communication module 250 may be an Email client or a telecommunication module and an Email address or mobile phone number of a user may be bound with the identified high-risk network access. In such a scenario, when the high-risk network access is detected, human user test engine 230 may send a test message through Email or Short Message Service (SMS) message to the user's Email box or mobile phone. The user may provide the answer to the test message by replying the Email or SMS message. When user communication module 250 receives the reply, the answer to the test message is sent to human user test engine 230 for verification. By sending the human user test message through an alternative channel (e.g., an out-of-band channel), it is more difficult for malware to bypass the human user verification.

In some embodiments, user communication module 250 may also be used as an alternative channel for sending the requested network resource after the network access is allowed by risk management module 220.

Figure 3:
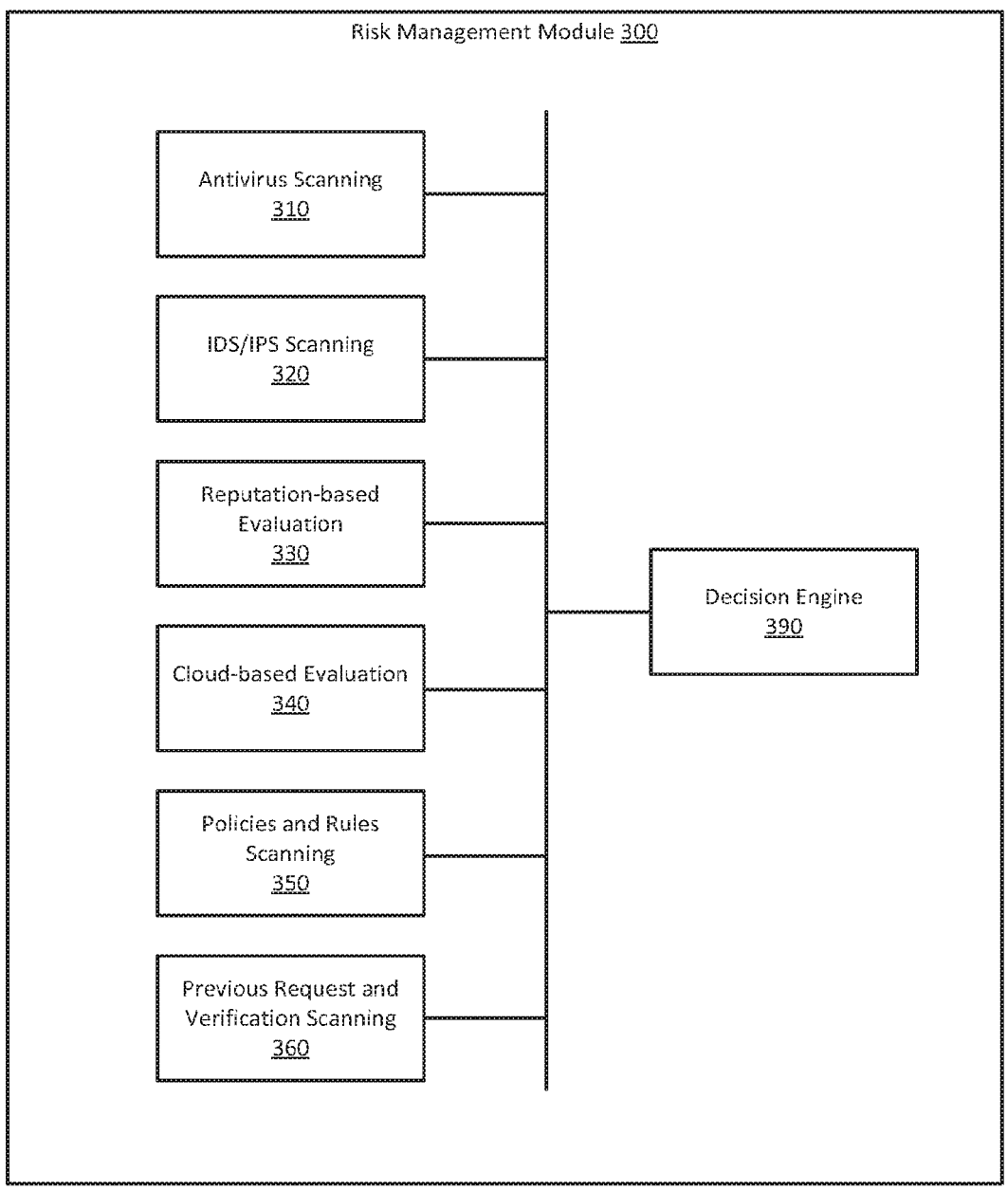
FIG. 3 illustrates exemplary functional units of a risk management module in accordance with an embodiment of the present invention.

FIG. 3 illustrates exemplary functional units of a risk management module 300 in accordance with an embodiment of the present invention. Risk management module 300 is configured for scanning data packets to inspect high risk network accesses. Examples of high risk network accesses include, but are not limited to, operations that are initiated by computer virus, network intrusion or malware, such as downloading a malware from a remote server, uploading sensitive information to a remote server, initiating or participating in DDoS attacks on internal or external computers. High risk network accesses may also include operations that violate security policies or rules setup by the security device. Therefore, risk management module 300 may comprises multiple detection modules that scan data packets or network resources at multiple network layers. In this embodiment, risk management module 300 comprises antivirus scanning 310, IDS/IPS scanning 320, reputation-based evaluation 330, cloud-based evaluation 340, policies and rules scanning 350, previous request and verification scanning 360 and decision engine 390. Antivirus scanning 310 is configured for scanning computer virus contained in a data packet, a session, a stream or a file. IDS/IPS scanning 320 is configured for detecting a potential intrusion from other computers. Reputation-based evaluation 330 is configured for scanning software, files, Emails, IP addresses or domain names based on reputations aggregated by multiple users. Cloud-based evaluation 340 is configured for scanning software, files, Emails, IP addresses or domain names by cloud-based scanning service. Policies and rules scanning 350 is configured for determining if a network access is allowed based on the policies or rules that is setup by the network administrator. The policies or rules may regulate a network access based on the incoming interface, the outgoing interface, the source address, the destination address, the schedule, the service of the network access etc. The policies may setup content filters or Email filters to prevent certain contents from going through the private network by checking keywords or other sensitive information contained in the contents or Emails. Previous request and verification scanning 360 is configured for determining if a network access is allowable based on the characteristics of previous access requests and the outcome of user verifications. For example, a previous access was allowed by the user but it is then detected to be a virus. When the same or similar access is captured again by risk management module 300, it will be determined as a high risk network access. It is appreciated to a person skilled in the art that other scanning modules or devices for other scanning functions may incorporated into risk management module 300 and any of the scanning modules may be integrated into or separated from risk management module 300. It is also possible that these scanning modules may be products from different manufacturers.

Decision engine 390 is configured for aggregating the outcomes of different scanning modules to determine if the captured network access is a high risk network access for which it would be desirable to obtain a human user verification before it is allowed/blocked. Each of the scanning modules may provide a result after scanning the network access. The result may a Boolean (e.g., true/false) value which represents if the scanning is passed. Alternatively, the result may be a percentage value or other value that represents the possibility that the network access is a high risk access. Decision engine 390 may combine the results received from the scanning modules to determine if the network access is a high risk one. It will be appreciated by those of ordinary skill in the art that there are many algorithms for combining such results to determine a final result. For example, each result of the scanning engines may have a weight and a sum of the weighted results may be calculated. If the sum is over a predetermined threshold, the network access may be determined as a high risk one. It is also possible that the network access is determined to be a high risk one when any one of the results from the scanning modules is over a threshold.

Figure 4:
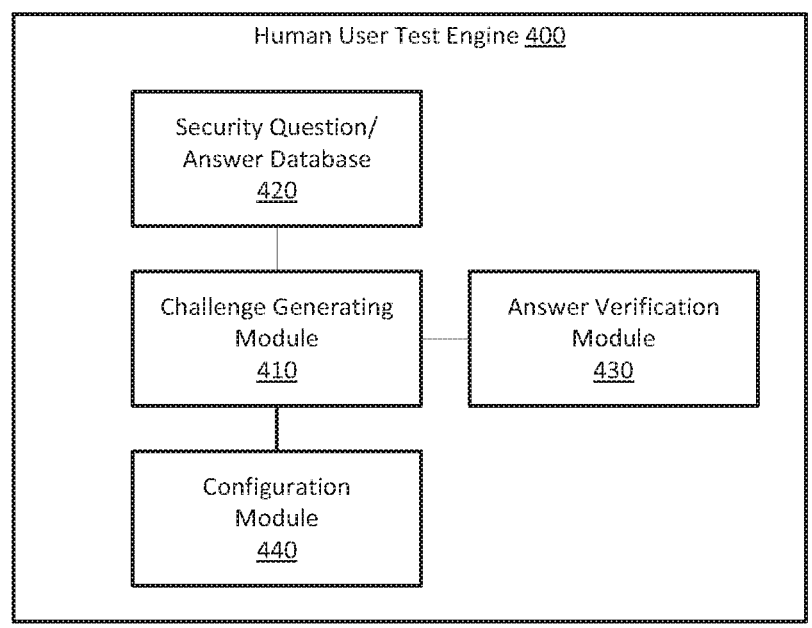
FIG. 4 illustrates exemplary functional units of a human user test engine in accordance with an embodiment of the present invention.

FIG. 4 illustrates exemplary functional units of a human user test engine in accordance with an embodiment of the present invention. The human user test engine is used for generating a challenge/answer test so that an action may be identified as initiated by a human user, as opposed to an automatic process that is running on a user's computer. In the embodiment shown in FIG. 4, human user test engine 400 comprises challenge generating module 410, security question/answer database 420, answer verification module 430 and configuration module 440. Challenge generating module 410 is configured for dynamically generating a challenge question when a high risk network access is detected. The challenge question may be a Completely Automated Public Turing test to tell Computers and Humans Apart (CAPTCHA). The CAPTCHA may be a picture or audio clip in which disturbances, such as deformations and/or noise, are incorporated so that the content thereof can be recognized by a human user but is difficult to be recognized by an automated process.

In addition to or instead of CAPTCHA, human user test engine 400 may perform other human user tests. In one embodiment, human user test engine 400 may further comprise security question/answer database 420 which keeps challenge questions and answers that are only known by the users. The challenge question and answer may be a username and password pair, for example. The challenge question may be a question that can be answered with the help of a physical device that the user possesses. For example, the challenge question may be what is the number of X line and Y column of a password card or what is the number on a smart card or a secure token of the user. Only the user who currently possesses these auxiliary security devices may check with these auxiliary security devices and provide the correct answer to the challenge question.

Human user test engine 400 may further comprise configuration module 440 for setting up customized challenge questions and answers by users themselves. Users may create question/answer pairs based on their personal information and keep these customized question/answer in security question/answer database 420. Challenge generating module 410 may select one of these customized questions from security question/answer database 420 when a human user verification is needed. Further, configuration module 440 may also be used by a user to select his/her preferred mode or parameters of the human user test.

Answer verification module 430 is used for receiving an answer from the potential user and comparing the received answer with the correct answer of the challenge question which may be kept at security question/answer database 420. If the received answer is correct, that means the verification is confirmed by the human user and the verification is not bypassed by an automatic process. Then the verification is sent to the risk management module and the network access is allowed by the risk management module if the verification is correct.

Figure 5:
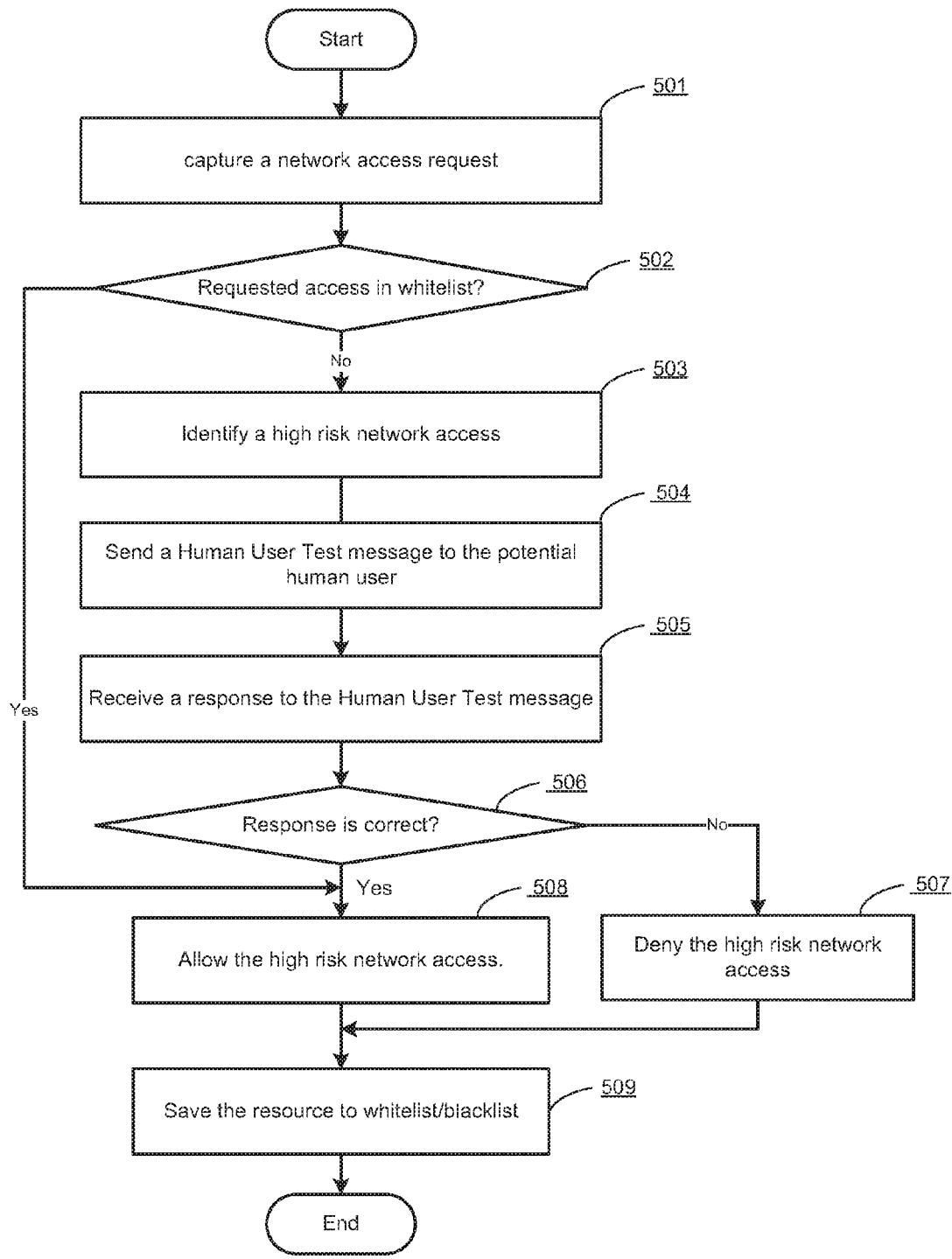
FIG. 5 is a flow diagram illustrating a method for verifying a human user in accordance with an embodiment of the present invention.

FIG. 5 is a flow diagram illustrating a method for verifying a human user when a high risk network access is captured in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 501, a network access is captured by an intermediary network security device that is used for separating an internal network with other computing devices. The network access may be a data packet, a network session or an access to a network resource. The access may originate from the internal network and be directed to a remote computing device or may originate from a remote computing device and be directed to the internal network.

At block 502, the security device checks with a whitelist to verify if the access is allowed by the administrator or the user of the internal network. If yes, the process goes to block 508 and the network access is allowed without human user verification. Similarly, a blacklist may also be used to verify if an access is already denied by the administrator or the user. If the access is in the blacklist, the process goes to block 507 and the access is blocked by the security device without any further verification.

If the network access is not in the whitelist and blacklist, at block 503, the security device checks if the network access is a high risk network access. The network may be sent to multiple scanning engines to verify if it is a high risk access. Each scanning engine checks the network access at different network layers and provides an outcome of its scanning. The security device then aggregates all the outcomes from different scanning engines to determine if the network access is a high risk one.

At block 504, a human user test message is generated and sent to the potential user when a high risk network access is identified. The human user test message may be a visual or audio CAPTCHA message or other security challenge questions that are different to be recognized by an automatic process. In one embodiment, the human user test message may be sent to the source of the network access as a response to the network access. It is also possible that the network access is redirected to a web page showing the human user test message. In another embodiment, an administrator or a user may setup an alarm Email address or phone number for some high risk accesses. When these high risk accesses are captured by the security device, an alarm Email or SMS message with the human user test may be sent to the user/administrator.

At block 505, a response to the human user test is received by the security device. Since the human user test message is not a simple verification such as an OK message that can be easily generated and sent by an automatic process running on the user's computer, a correct response can be sent only by a human user.

At block 506, the received response is compared with the correct answer of the challenge question. If it is not a correct answer, the process goes to block 507 and the network access is blocked.

If the response is correct, at block 508, the network access is allowed by the security device. The captured high risk network access may be allowed in different manners based on the type of the access. If the captured access is a data packet, it may be routed to the destination by the security device after a correct confirmation to the human user verification is received from the user. If the original access request was redirected to a human user test page for verification at the stage of verification, the security device may then direct the access back to the resource originally requested. If the requested resource is temporarily stored on the security device when the user was doing the verification, the security device may directly return a copy of the requested resource temporarily stored on the security device. Further, the security device may send a resource originally requested to the user via an alternative secure channel other than the original network link. For example, the requested resource may be sent to the user by Email or SMS. Optionally, the security device may present the user with an alternative URL that point to a copy of the resource that is temporarily stored on the security device.

At block 509, the security device may update its whitelist/blacklist according to the received response from the user so that the security device may directly allow/block future access to the same resource.

Figure 6:
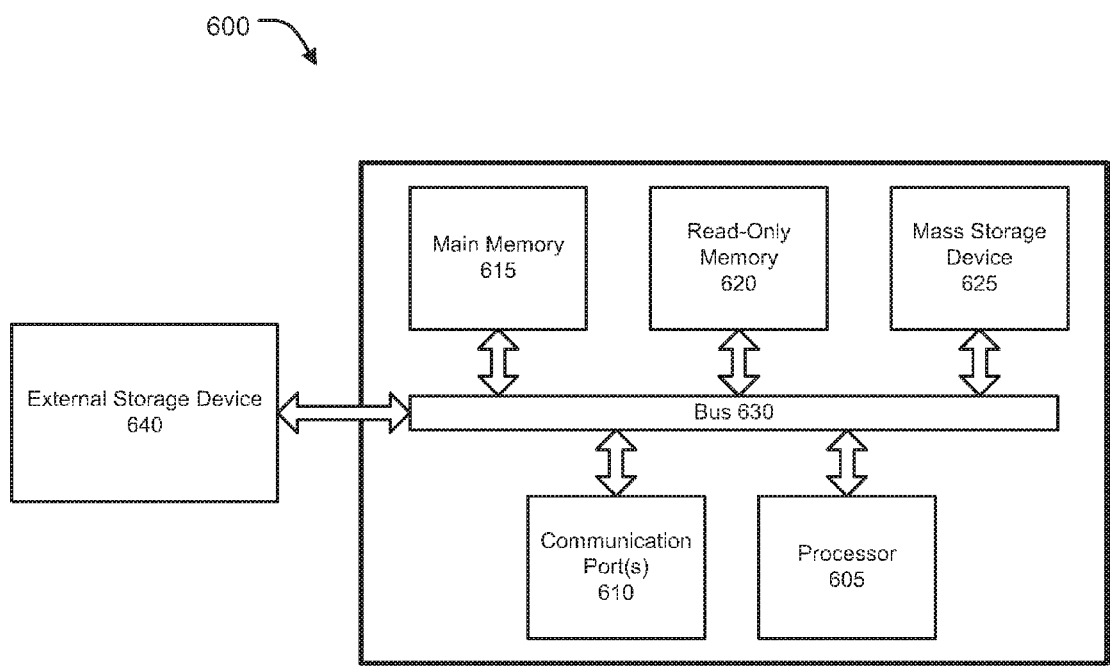
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of a security device that performs human user verification when a high risk network access is captured.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with monitoring unit as described in FIGS. 2-4. Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A network security appliance comprising:
 a non-transitory storage device having embodied therein one or more routines;
 one or more hardware processors coupled to the non-transitory storage device and operable to execute the one or more routines; and
 wherein the one or more routines include:
 a network traffic control module, which when executed by the one or more hardware processors, identifies a high-risk network access initiated by a device associated with a private network protected by the network security appliance, wherein the high-risk network access poses a risk to the device, a human user of the device or the private network;

a human user test engine, which when executed by the one or more hardware processors:

sends a human user test message to the human user of the device to verify that the high-risk network access was initiated by or is otherwise authorized by the human user of the device;

sends a correct response to the human user of the device;

receives a response to the human user test message, wherein one or more of the correct response and the response is sent or received, respectively, through an alternative channel different from a channel through which the high-risk network access was initiated; and determines whether the response is the correct response to the human user test message; and a risk management module, which when executed by the one or more hardware processors, allows the high-risk network access when the response is correct.

2. The network security appliance of claim 1, wherein said identifying a high-risk network access is based on one or more of:

an outcome of an antivirus scan of a requested resource performed by the network security appliance;

an outcome of an intrusion detection system/intrusion protection system (IDS/IPS) scan of a request and a response performed by the network security appliance;

an outcome of a reputation-based evaluation of characteristics of an access performed by the network security appliance;

an outcome of a cloud-based evaluation of the characteristics of the access performed by a remote computer as requested by the network security appliance;

an outcome of a scan based on policies and rules configured on the network security appliance; and an outcome of a scan based on characteristics of one or more previous access requests and user verifications.

3. The network security appliance of claim 1, wherein verification that the high-risk network access was initiated by or is otherwise authorized by the human user of the device comprises causing a Completely Automated Public Turing test to tell Computers and Humans Apart (CAPTCHA) to be presented to the human user of the device and verifying a solution allegedly provided by the human user of the device.

4. The network security appliance of claim 1, wherein verification that the high-risk network access was initiated by or is otherwise authorized by the human user of the device comprises causing a challenge question to be presented to the human user of the device and verifying an answer allegedly provided by the human user of the device.

5. The network security appliance of claim 4, wherein the challenge question and the answer comprise a security question and an answer previously set by the human user of the device.

6. The network security appliance of claim 4, wherein the challenge question and the answer comprises a user name and password pair.

7. The network security appliance of claim 4, wherein the challenge question at least part of the answer is provided by a physical device in the possession of the human user.

8. The network security appliance of claim 7, wherein the physical device comprises one or more of a password card, a smart card and a secure token.

9. The network security appliance of claim 1, wherein verification that the high-risk network access was initiated by or is otherwise authorized by the human user of the device comprises presenting the human user test message to the human user of the device.

10. The network security appliance of claim 9, wherein the alternative channel comprises an email address or a mobile phone number of the human user.

11. The network security appliance of claim 1, wherein the human user test engine maintains a resource whitelist/blacklist containing information regarding network resources to which access is to be allowed/blocked without performing verification that the high-risk network access was initiated by or is otherwise authorized by the human user.

12. The network security appliance of claim 2, wherein allowance of the high-risk network access comprises one or more of:

redirecting the human user of the device to the requested resource;

directly returning a copy of the requested resource temporarily stored on the network security appliance;

presenting the human user of the device with an alternative Uniform Resource Locator (URL) that points to a copy of the requested resource temporarily stored on the network security appliance; and sending the requested resource to the human user of the device via the alternative channel.

* * * * *